(12) United States Patent
Smith

(10) Patent No.: US 6,583,863 B1
(45) Date of Patent: Jun. 24, 2003

(54) SINGLE PHOTON IMAGING AND TIMING ARRAY SENSOR APPARATUS AND METHOD

(75) Inventor: R. Clayton Smith, Boulder, CO (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/977,873

(22) Filed: Oct. 15, 2001

(51) Int. Cl.[7] .......................... G01C 3/08; G01B 11/26; H04N 7/18
(52) U.S. Cl. ................ 356/5.01; 356/5.04; 356/141.1; 348/135
(58) Field of Search .................... 356/141.1, 5.01–5.08; 348/135

(56) References Cited

U.S. PATENT DOCUMENTS 6,133,989 A   10/2000   Stettner et al. ............ 356/4.01
6,137,566 A * 10/2000   Leonard et al. .......... 356/141.1
6,323,942 B1 * 11/2001   Bamji ....................... 356/5.01

* cited by examiner

Primary Examiner—Stephen C. Buczinski
(74) Attorney, Agent, or Firm—Madson & Metcalf

(57) ABSTRACT

An apparatus and method are disclosed for generating a three-dimension image of an object or target. The apparatus is comprised of a photon source for emitting a photon at a target. The emitted photons are received by a photon receiver for receiving the photon when reflected from the target. The photon receiver determines a reflection time of the photon and further determines an arrival position of the photon on the photon receiver. An analyzer is communicatively coupled to the photon receiver, wherein the analyzer generates a three-dimensional image of the object based upon the reflection time and the arrival position.

20 Claims, 6 Drawing Sheets

SINGLE PHOTON IMAGING AND TIMING ARRAY SENSOR APPARATUS AND METHOD

GOVERNMENT RIGHTS

This invention was made with Government support under Contract Number W-7405-ENG-36 awarded by the United States Department of Energy to The Regents of the University of California. The Government has certain rights in the invention.

BACKGROUND OF THE INVENTION

1. Field of the Invention

The present invention relates to imaging apparatuses and methods. More specifically, the invention relates to imaging apparatuses and methods for characterizing objects by emitting and receiving photons.

2. Description of Related Art

Three-dimensional image scanning has long been a desired tool in many technical fields. Fields such as manufacturing, military technology, and medical treatments have varying applications for this technology. Three dimensional images allow for close inspection and computer image manipulation of the imaged object. Further, objects that are scanned may be rapidly reproduced and manufactured by eliminating physical measuring and computer drafting time. Early applications of this technology were limited in effectiveness and practicality because of the extremely high number of data points that were required to be processed and the speed of computers to process the data.

These previous applications of three-dimensional imaging apparatuses and methods also employed various inefficient methods of collecting the data points of the object. Some of these methods included physically measuring a large number of points on the object with a stylus or other device to obtain the three axes coordinates for points along an image model. Other imaging devices bombarded the object with a large number of waves or particles.

The waves or particles were emitted at the target and collected as they return to the source. While these procedures allowed for a large number of data points to be taken along the object, the shear volume of data points collected in the imaging processes overwhelmed the accompanying computer. Additionally, the large number of data points created a significant amount of noise in the image results, causing variation and inaccuracies in the image. These drawbacks add to the time required to image an object and the cost of the equipment. Resultantly, three-dimensional imaging has not been fully employed to its maximum potential in many fields because of these limitations.

Therefore, what is needed is a three-dimensional imaging device and method that is capable of minimizing the number of data points required to image a three-dimensional object and that is capable of minimizing the analyzing time of the collected data.

SUMMARY OF THE INVENTION

The present invention has been developed in response to the current state of the art, and in particular, in response to these and other problems and needs that have not been fully or completely solved by currently available three-dimensional imaging technology. The present application discloses an imaging apparatus comprising a photon source, a photon receiver, and an analyzer. The photon source is configured to emit a photon at a target. Once the photon impacts the target, the photon reflects to the photon receiver. The photon receiver is configured to identify a reflection time of the photon and an arrival position of the photon on the photon receiver. Once the reflection time and arrival position are known, the information is transferred to the analyzer. The analyzer is configured to associate the arrival position with a position on an X-Y plane and to associate the reflection time with a Z-height of the X-Y position.

The imaging apparatus is capable of imaging the characteristics of two-dimensional objects, three-dimensional objects, and geographical features among other objects. The reflection time of the photon is determined from a voltage analog established by charging a voltage storage device during the interval between the photon emitting from the photon source and the photon being received by the photon receiver. In one embodiment the charging voltage is linear; in another embodiment the voltage charge is exponential.

An alternative embodiment of the imaging apparatus may comprise a photon source that emits a photon pulse at a target. The photons reflecting from the target impact on a photon receiver having an array of geometrically arranged pixels. The geometrically arranged array of pixels is configured to identify a plurality of photon arrival positions on the array. The imaging apparatus also has a plurality of timing circuits coupled to the geometrically arranged pixels. The timing circuits are configured to determine the reflection time of individual photons received by the photon receiver. The arrival position and reflection time are then transferred to an analyzer where the reflection times and the photon arrival position are analyzed to determine the geometric characteristics of the target.

In operational terms, the apparatus emits a photon pulse at a target and a plurality of timers are started in response to the emitted photon pulse. Next the photon pulse impacts the target and a number of photons reflect off of the target. The reflected photons are received on a geometrically arranged array. The locations on the array where the photons are received, establishes a plurality of arrival positions. A number of timers are also stopped upon receipt of an emitted photon on the geometrically arranged array. The time between the timer starting and stopping establishes a reflection time for individual photons. Finally, the arrival positions of the photons are compiled to generate an outline of the target in the X-Y plane and the reflection times of the individual photons are associated with positions on the outline to define the Z-components of the target. Thus, the arrival positions define the X and Y positions of the three-dimensional image and the reflection times define the Z positions of the three-dimensional image.

BRIEF DESCRIPTION OF THE DRAWINGS

In order that the manner in which the above recited and other advantages and objects of the invention are obtained, a more particular description of the invention briefly described above will be rendered by reference to specific embodiments thereof, which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of presently preferred embodiments of the invention.

Figure 1:
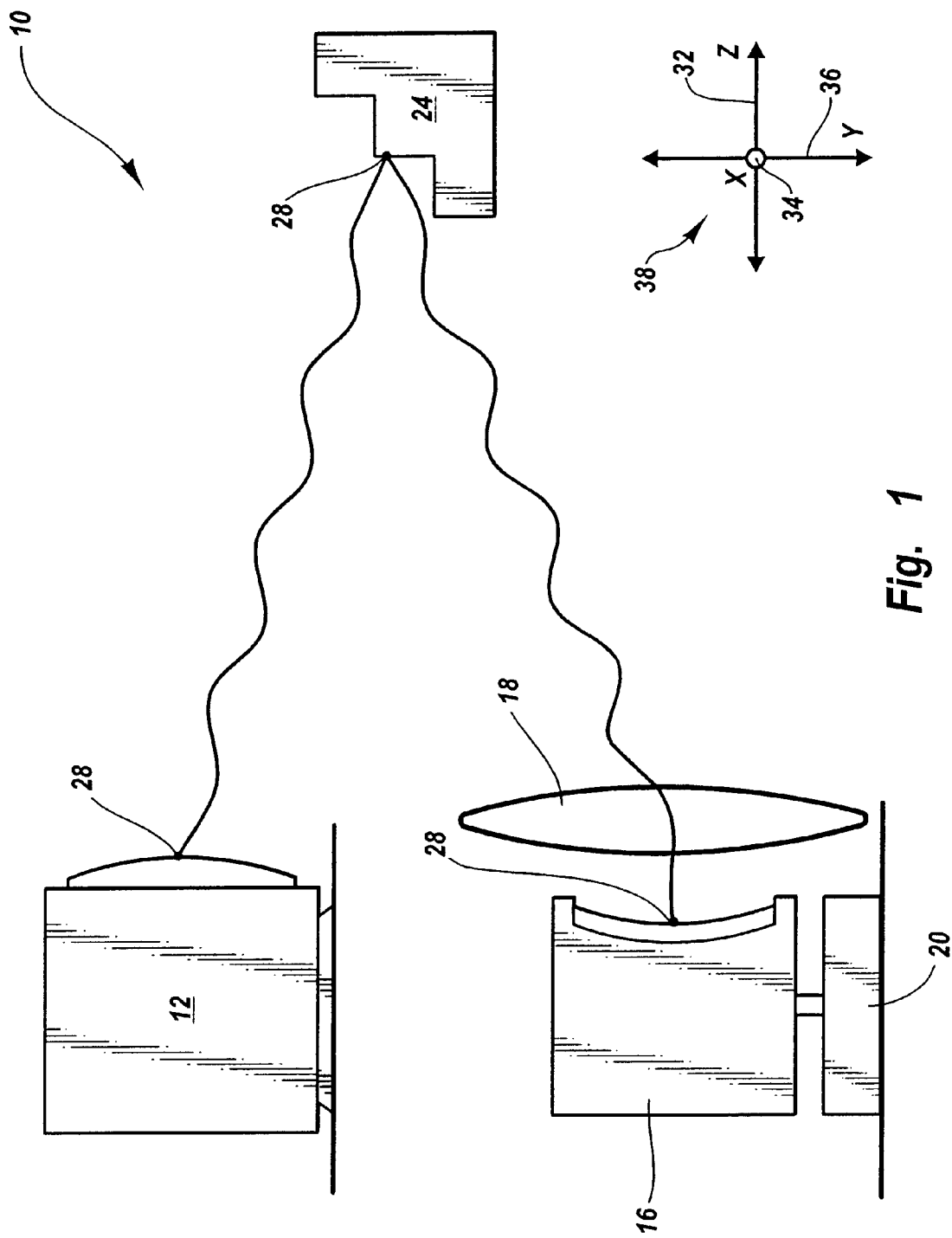
FIG. 1 is a plan view of an embodiment of the apparatus.

FIG. 1 demonstrates an imaging apparatus 10 comprising a photon source 12, a photon receiver 16, and an analyzer 20. The members of the imaging apparatus 10 function in a coordinated system to provide a two-dimensional or three-dimensional image of a target 24. The target may be any number of objects, such as an automobile, a machine part, or geographical topography. During operation of the apparatus, the photon source 12 emits a photon 28 directed at the target 24. The emitted photon 28 impacts and reflects from a geometric feature of the target 24. As illustrated in FIG. 1, the photon 28 impacts and reflects from the second step of a three step object.

Once the photon 28 reflects from the target 24, the photon 28 is received by the photon receiver 16. In order to receive the photon 28 reflecting off of the target, the photon receiver 16 must be in a proper position to ensure that the photon 28 impacts the photon receiver 16. The position of the photon receiver 16 will vary depending upon the geometry of the target 24 and the imaging environment. With an object such as at the three step target 24 depicted in FIG. 1, the receiver should face the target in order to receive the photon. However, other targets and photon receiver designs will dictate the position to place the photon receiver 16 in reference to the target 24 and the photon source 12.

The photon receiver 16, when in a proper reception position, is capable of receiving and measuring individual photons on a single photon level. Thus, the photon receiver 16 in FIG. 1 could measurably receive the single photon 28 reflecting off of the second step of the target 24. In other imaging operations, the imaging apparatus 10 will require larger numbers of photons to bombard to entire surface of the three dimensional target 24. The large number of photons or photons pulse would bombard the entire surface of the target 24 and reflect back to the photon receiver 16. However, even when a photon pulse is used to image the target 24, the photon receiver 16 remains capable of receiving and measuring the individual photons of the photon pulse. Thus, each photon 28 reflecting off of the target 24 is capable of providing measurable data point for imaging the target 24.

By receiving and measuring photons at a single photon level, the imaging apparatus 10 can efficiently obtain the data points of the geometric characteristics of the target 24. The measuring of single photons by the present apparatus 10 is more efficient than methods that require a large number of photons reflecting from target to determine a single data point. Attempting to receive and measure a large number of photons reflecting from the target will decrease the accuracy of each data point and flood the imaging apparatus with large amounts of unnecessary data.

Conversely, by measuring only single photons, the minimum amount of data points can be used to obtain an image of the target 24. By limited the amount of data points required to image the target, the time and processing required to make an image can be reduced. Additionally, larger numbers of photons can produce a significant amount of noise that increases the amount of processing of the imaging data and decreases the resolution of the image. By measuring single photons reflecting off of the target, the amount of noise in imaging apparatus can be greatly reduced.

The photon receiver 16 operates to determine the reflection time and arrival position of individual photons 28 emitted from the photon source 12 and reflected off of the target 24. The reflection time of the photons 28 is the time between the photon 28 being emitted by the photon source 12 and the photon 28 being received by the photon receiver 16. Because the time required for the photon 28 to impact on the target 24 and reflect to the photon receiver 16 is primarily a function of the distance that the photon 28 travels, the reflection time is well suited for measuring a Z-component 32 or height of the target 24. Thus, the duration of the reflection time of a photon pulse will indicate the height of the target's 24 structure relative to the photon receiver 16.

While the reflection time determines the Z-component 32 of the target 24, the arrival position determines the location on an X-Y plane 34, 36 of the Z-component. The X-Y plane is the plane encompassing both the X-axis 34 and the Y-axis 36. The arrival position of the photon 28 is the location on the photon receiver 16 in the X-Y plane, 34, 36 where the photon 28 impacts after reflecting off of the target 24. A larger number of photons reflecting off of the target 24 will have multiple arrival positions that form an outline of the target 24 shape. By applying the Z-heights 32 to the various outline points in the X-Y plane 34, 36, a three-dimensional image of the target 24 may be obtained.

To generate a three-dimensional image of the target, the photon data received by the photon receiver 16 is transferred to the analyzer 20. The analyzer is configured to receive the arrival positions and the reflection times and then compile the information into three-dimensional coordinates of the imaged target 24. Typically, the analyzer 20 receives the arrival positions and reflection times in the form of signal sources and signal amplitudes or other analog values that corresponds to the geometry of the object. From these signals the analyzer 20 determines an X-coordinate, Y-coordinate, and Z-coordinate to describe the target 24.

Figure 2:
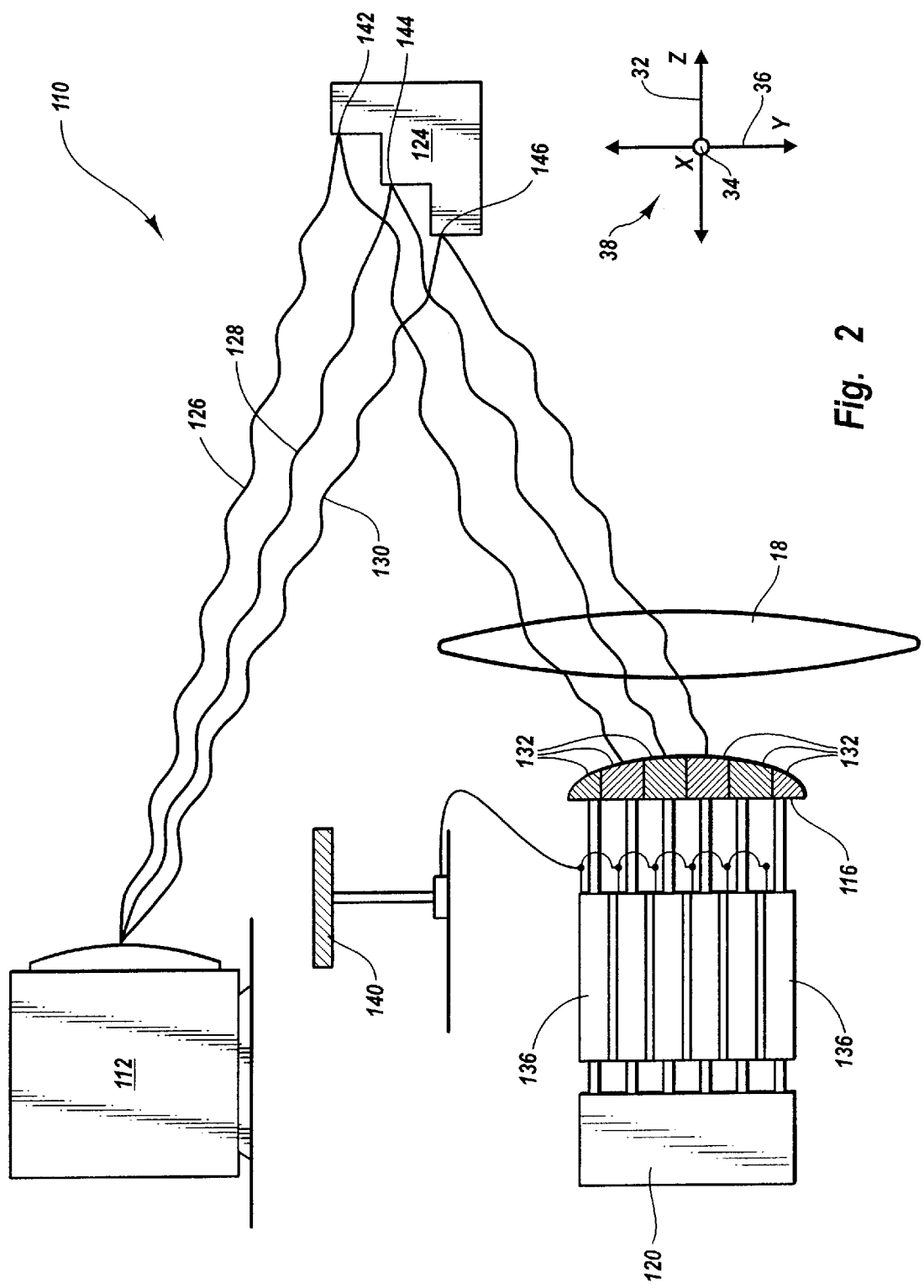
FIG. 2 is a plan view of an alternative embodiment of the apparatus.

FIG. 2 demonstrates a variation of the imaging apparatus 110 that is similar to the imaging apparatus 10 of FIG. 1 in having a photon source 112, a photon receiver 116 including optics 18, and an analyzer 120. The photon source 112 is configured to emit a photon or photon pulse at a target 124. The photon source may be a laser configured to emit a pulse of photons at a target. The photon pulse may be a narrow pulse of photons that reflect off of only a small portion of the target 24 or the photon pulse may be large enough to impact the entire surface of the target with a single pulse. Other types of photon sources 112 may collect a large number of data points by scanning across a target through a series of scanning sweeps. The sum of the sweeps could then be compiled into a complete image of the target. Generally, the photon source 112 can be any number of photon emitting devices that are capable of emitting a photon pulse at a target and having the photons reflect back to the photon receiver 116.

In FIG. 2, the photon pulse emitted from the photon source 112 is depicted as three photons 126, 128, 130 each impacting a different step of the three step target 124. The first photon 126 impacts the first step 142, the second photon 128 impact the second step 144, and the third photon 130 impacts the third step 146. The emitted photons 126, 128, 130 that impact on the target 124 are then reflected from the target 124 toward the photon receiver 116. To receive the reflected photons, photon receiver 116 could be positioned anywhere in the path of the reflected photons 126, 128, 130. The photon receiver 116 may be in a number of locations to receive the photons 126, 128, 130. For example, the photon source 112 may be placed directly behind the photon receiver 116, such that the photons 126, 128, 130 reflect normal to the surface of the target 124 and impact on the photon receiver 116.

As the photons 126, 128, 130 reflect from the target, they are focused by the optics 18. Thereafter, the photons 126, 128, and 130 impact upon an array of geometrically arranged pixels 132 of the photon receiver 116. The geometrically arranged array of pixels 132 may be in a grid pattern in the X-Y plane 34, 36. The grid pattern of pixels 132 registers the impact of individual photons 126, 128, 130 on individual pixels 132. The individual pixels 132 are typically spatially resolved in a location where the X-Y position of each pixel 132 is known. By impacting on generally small individual pixels, the pixels can register complex outline shapes of objects from which photons are reflected. Thus when all of the pixels 132 impact upon by photons are viewed as a whole, the sum of the pixels 132 form an outline of the target 24 in the X-Y plane 34, 36.

Once a basic outline, or the X-Y coordinates 34, 36, of the target 24 is known, a Z-component 32 can be added to the individual pixel 132 location to provide the third dimension of the target 24. To determine the Z-component of the target 24, a plurality of timing circuits 136 are provided. In the imaging apparatus of FIG. 2, each pixel 132 is coupled to a timing circuit 136. By coupling a timing circuit 136 to each pixel 132, the timing circuits 136 are able to measure the reflection time of individual photons 126, 128, 130 impacting on individual pixels 132. From the reflection times of the photons, the Z-components 32 of the target 24 may be determined.

Because the reflection time is a function of the distance a photon travels, the reflection time can be used to determine the Z-component of various points along the target's surface. To accurately determining the Z-component 32 of various points of the target 124, the reflection time of each photon should be consistently measured. To consistently measure the reflection time of a plurality of photons, the emitted photons should have a common frame of reference. In the imaging apparatus, the emitted photons may be referenced from a common starting time. By simultaneously emitting a number of photon to towards the target 124, the time when each photon returns can be relatively compared.

In order for the timing circuits 136 to accurately and consistently measure the reflection times of the photons 126, 128, 130, the timing circuit 136 must begin timing the reflection times simultaneously. To simultaneously start multiple timing circuits 136, the timing circuits 136 may be coupled to a sensor 140. The sensor 140 would be communicatively connected to each the timing 136 circuits so that the sensor 140 would simultaneously signal all of the timing circuits 136 to begin a timing function. Thus, each of the timing circuits 136 would have a common starting point from which to measure and compare the reflection time of multiple photons reflecting from the target 124.

In the imaging apparatus of FIG. 2, the sensor 140 is a radiant light sensor that is situated in the path of a photon pulse 126, 128, 130 or within an operable distance of the photon pulse 126, 128, 130. As the photon pulse 126, 128, 130 is emitted from the photon source 112, the sensor 140 sends a signal to the timing circuits 136 to begin the timing function. Alternatively, the sensor 140 may be coupled to a trigger that initiates the emission of the photon pulse 126, 128, 130. Thus, as the trigger signals the photon source 112 to emit the photon pulse 126, 128, 130, the sensor 140 will detect the triggering signal and send a signal to the timing circuits 136 to begin the timing function. Other sensors 140 may signal the timing circuits 136 to begin timing independent of the photon pulse, while still allowing proper measurement of the reflection time.

The timing function of the multiple timing circuits 136 continues to measure the reflection time of the photons until a photon impacts a pixel 132 that is coupled to a timing circuit 136. Once a reflected photon is received on a pixel 132, the timing circuit 136 that is coupled to the pixel 132 stops the timing function. Other timing circuits 136 similarly stop their timing functions upon receiving reflected photons on their associated pixels 132. Thus, the multiple timing circuits 136 simultaneously begin their timing functions at a common time, but each individual timing circuit only ends its timing function upon receiving a reflected photon. From the relative difference in times obtained from individual timing circuits 136, a range of reflection time may be obtained.

To accurately measure the reflection time of photons that travel at the speed of light, the timing circuits 136 must have an accurate and fast method of measuring the reflection time. One method of measures reflection times is by charging a voltage during the duration of the reflection time. The voltage may be charged on a voltage storage device, such as a capacitor, of other voltage charging member.

To measure the reflection time, the timing circuit begins charging the voltage storage device as the photon pulse 126, 128, 130 is emitted from the photon source 112. The voltage continues to charge in each of the timing circuits 136 until a photon is impinged on the pixel 132 that is coupled to the timing circuit 136. Once a photon is received on a pixel 132, the attached timing circuit 136 stops charging the voltage on the voltage storage device. Because charging a voltage used high velocity electrons, the speed of the electrons in the voltage charging functions allows the timing circuits 136 to accurately measure the difference in photon reflections times.

By stopping the charging functions in the voltage storage devices upon receiving reflected photons, the voltage value in the voltage storage device will thus correspond to the reflection time of the photon. This voltage value may remain stored in the timing circuit 136 or alternatively, the voltage may be shifted out to another voltage storage member, such as the analyzer 120. The stored voltage value of each of the timing circuits is an analog value that corresponds to the reflection time of the photon that impinged on the pixel 132. The analyzer 120 may receive the voltage value from multiple timing circuits 136 where the relative magnitudes of the voltage values may be compared to identify the Z-height components 32 of the target 124.

Figure 3:
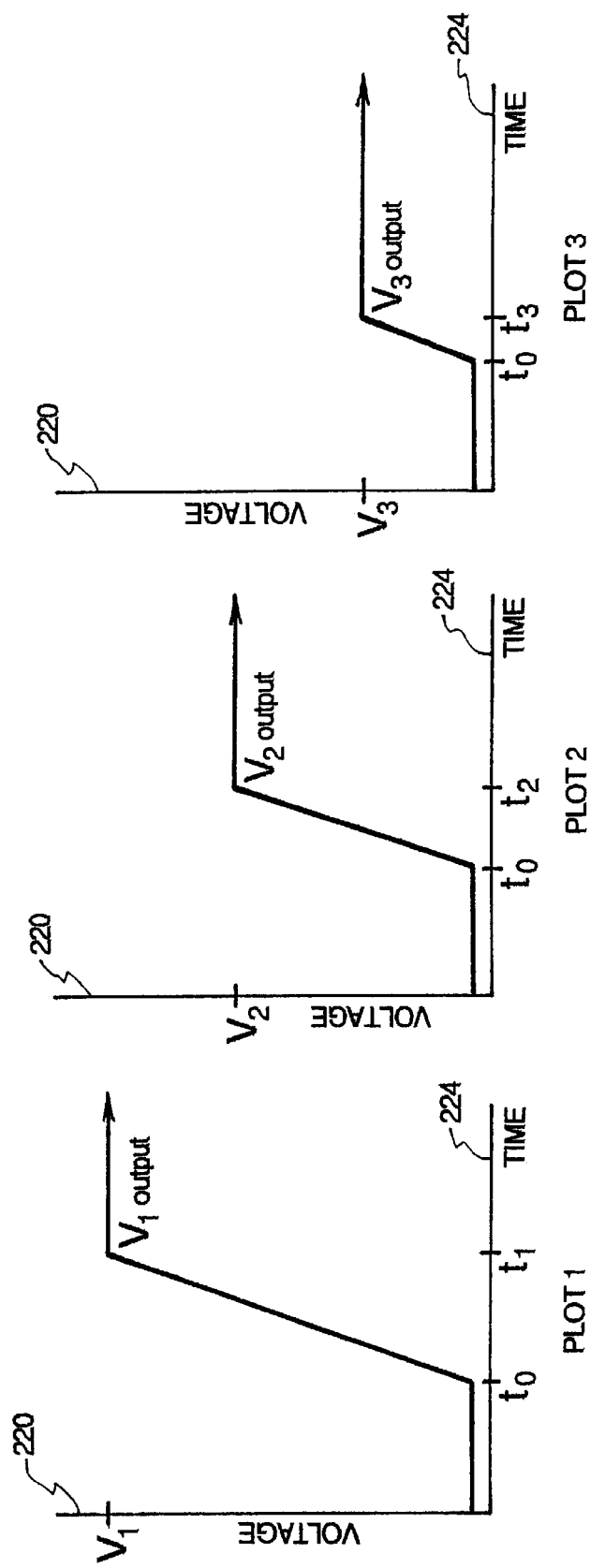
FIG. 3 is series of plots demonstrating a voltage relationship to reflection time.
Figure 4:
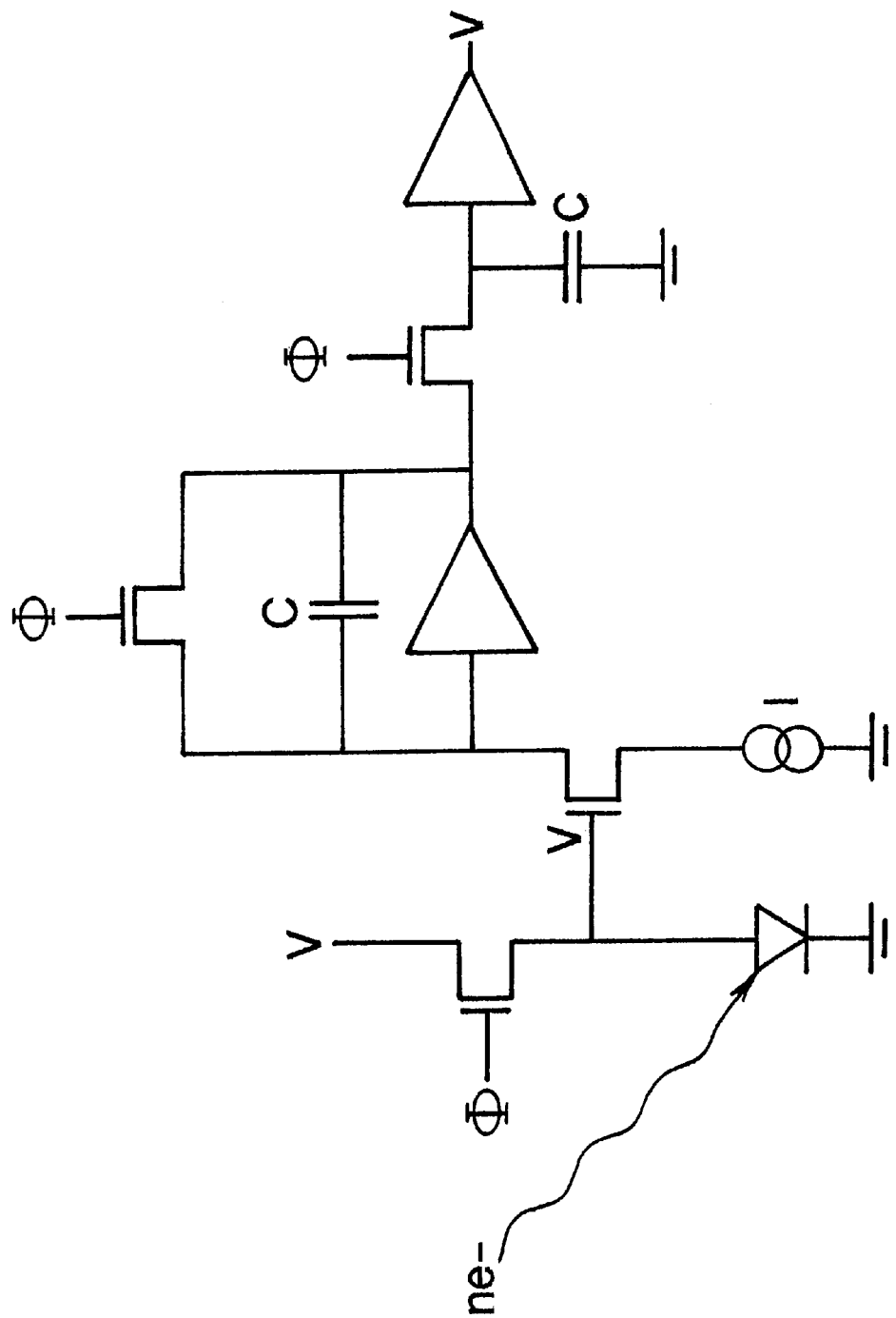
FIG. 4 is circuit diagram of an embodiment of a timing circuit.
Figure 5:
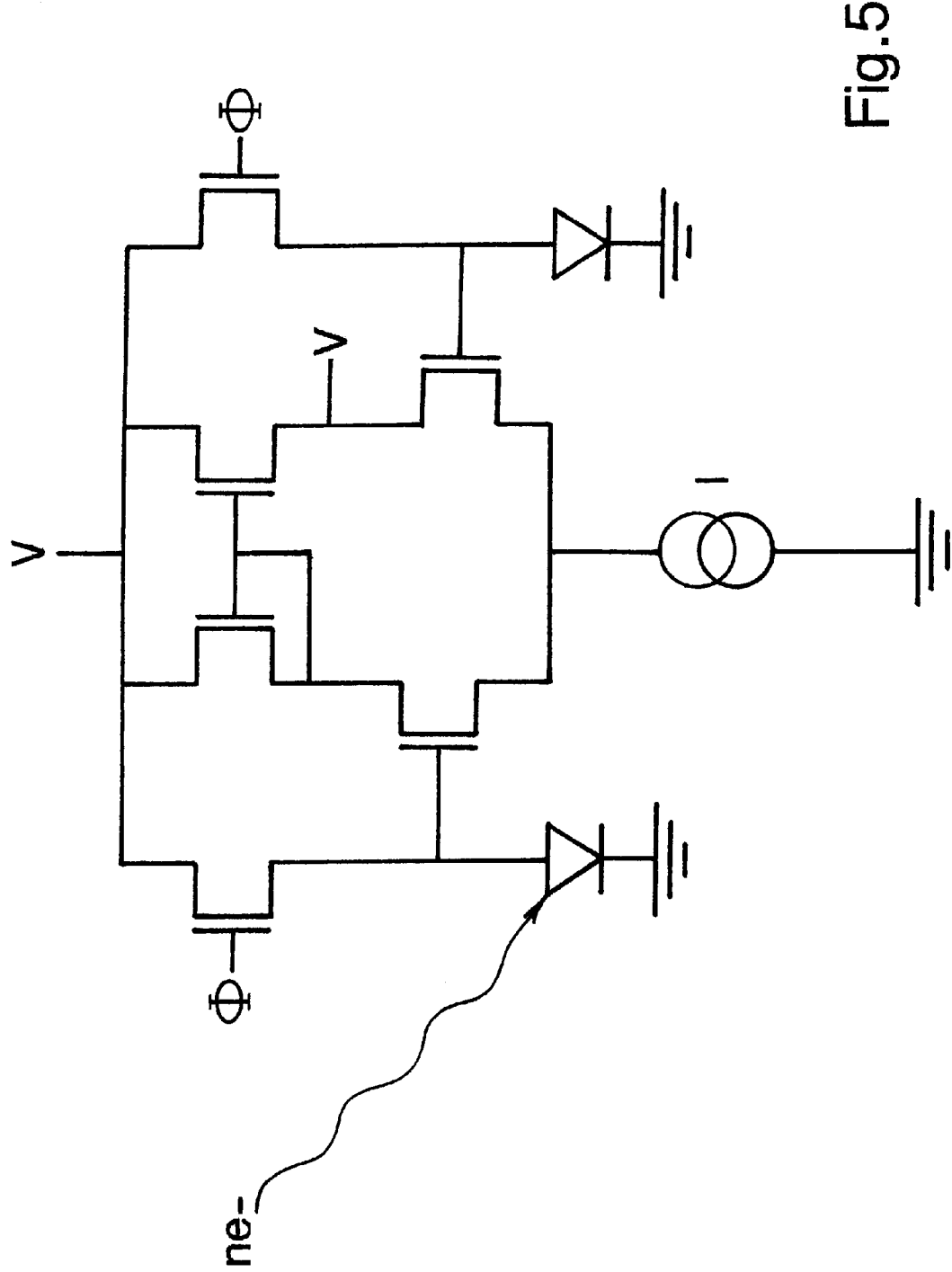
FIG. 5 is circuit diagram of an alternative embodiment of a timing circuit.

The charged voltage values for the first photon 126, the second photon 128, and the third photon 130 are represented in the plots 1–3 shown in FIG. 3. The first photon 126 corresponds to plot 1, the second photon 128 corresponds to plot 2, and the third photon 130 corresponds to plot 3. The three plots represent individual timing circuits 136 coupled to individual pixels 132 where the voltage value is displayed on the vertical axis 220 and the time is displayed on the horizontal axis 224. Each of the timing circuits represented in the plots has a non-charging voltage value until time $t_0$. At time $t_0$ a photon pulse is emitted from the photon source toward the target. As the photon pulse is emitted, voltage in each of the timing circuits 136 represented by plots 1–3 begins charging. In plot 1 the voltage $V_1$ stops charging at time $t_1$, where $t_1-t_0$ is the reflection time of the first photon 126 of FIG. 2. In plot 2 the voltage $V_2$ stops charging at time $t_2$, where $t_2-t_0$ is the reflection time of the second photon 128. Similarly, in plot 3 the voltage $V_3$ stops charging at time $t_3$, where $t_3-t_0$ is the reflection time of the third photon 130.

The plots 1–3 of FIG. 3 show that the voltage value in plot 1 is larger than the voltage value in plot 2 and that the voltage value in plot 2 is larger than the voltage value in plot 3. Comparing the plots of FIG. 3 to the three step structure of the target 124 in FIG. 2, demonstrates the magnitude of the voltage value corresponds to the Z-components of the three steps 142, 144, 146.

Each of the three steps 142, 144, 146 of the target 124 has a different distance from the photon receiver 116. The furthest step from the photons receiver 116 is the first step 142. Because the first step 142 is the furthest from the photon receiver 116, the first photon 126 must travel further than the second photon 128 or the third photon 130 to impact the first step 142 and reflect to the photon receiver 116. The longer reflection distance creates a larger reflection time for the first photon 126. As is demonstrated in plot 1, the larger the reflection time, $t_1-t_0$, corresponds to a large charging voltage.

Conversely, plot 3 relates to the path of the third photon 130 that impinges on and reflects from the third step 146. Because the third step 146 is closer from the photon receiver 116 than the first step 142, the reflection distance for third photon 130 is smaller than the reflection distance for the first photon 126. Similarly, plot 2 which corresponds to the second photon 128 has a shorter reflection distance than the first photon 126, but a larger reflection distance than the third photon 130. Because the reflection distance is directly related to the reflection time, the reflection time of the second photon 128 is less than the reflection time of the first photon 126. By charging the voltage storage devices during the duration of the reflection time, the longer the duration of travel will correspond to a larger the voltage value.

As is depicted in FIG. 3, each of the plots has a different voltage that corresponds to the Z-component 32 of a position on the X-Y plane 34, 36 of the target 124. By comparing the plots in FIG. 3 to the three step target 124 in FIG. 2, the voltage values the plots can be related to the height of the steps. The plots demonstrate that the higher the voltage value of the plot, the smaller the Z-component or height of the step. By obtaining a number of voltage values that relate to positions on a geometrically arranged array, a three dimensional image of the target 124 may be obtained.

In order to obtain a voltage that corresponds to the Z-height 32 of the target 124, the timing circuit 136 must be capable of performing the functions discussed above. Multiple designs of timing circuits 136 are possible to convert the reflection time of a photon into a voltage analog. An example of two timing circuit capable of performing the functions described above are depicted in FIG. 4 and FIG. 5. These timing circuits demonstrate a manner in which a voltage may be charged for a duration that is reactive to a photon emission and a photon reception. However, these timing circuits 136 are only illustrative of the design of timing circuits 136 that can be employed in the imaging apparatus 110.

Additionally, the imaging apparatus may employ a wide range of variations of timing circuits. For example, some timing circuits may begin charging the voltage before a photon pulse is emitted. This may be required when the sensor is unable to signal the timing circuits to begin charging the voltage before the photon receiver receives the reflecting photon. Additionally, signaling the voltage to begin charging before emitting the photon pulse may allow for a larger variety of voltage storage devices to be employed as well as provide greater control of readable voltage amplitudes.

Alternatively, the voltage may not begin charging in the timing circuits until a time after the photons have been emitted from the photon source. In these embodiments, the photon emission time may not be critical, so long as the timing circuits begin charging the voltage devices at the same time. This may be desirable in controlling charged voltage amplitudes, especially in low voltage read out systems. In yet other timing circuits, the timing circuits may begin charging multiple timing circuits at different intervals. The amplitude difference could then be added to the end analog value to create a proper image of the target. Other variations of the imaging apparatus may only charge the voltage storage devices in a limited number of timing circuits to provide a three-dimensional image for only a small portion of the object.

Besides employing analog timing circuits that charge a voltage to determine the reflection time, other methods of charging a voltage or simply measuring the reflection time may be employed. For example, FIG. 3 demonstrates a voltage charging during the reflections time. However, the process could also uncharge a voltage during the reflection time. Thus, objects nearer the photon receiver 116 would be characterized by a higher voltage and objects further from the photon receiver 116 would be characterized by a lower voltage. Additionally, the charging voltages in FIG. 3 are shown as linearly increasing voltages. However, the voltages may increase exponentially or may change according to a known function. These variations in the voltage charging may allow for increased resolution of the image.

Figure 6:
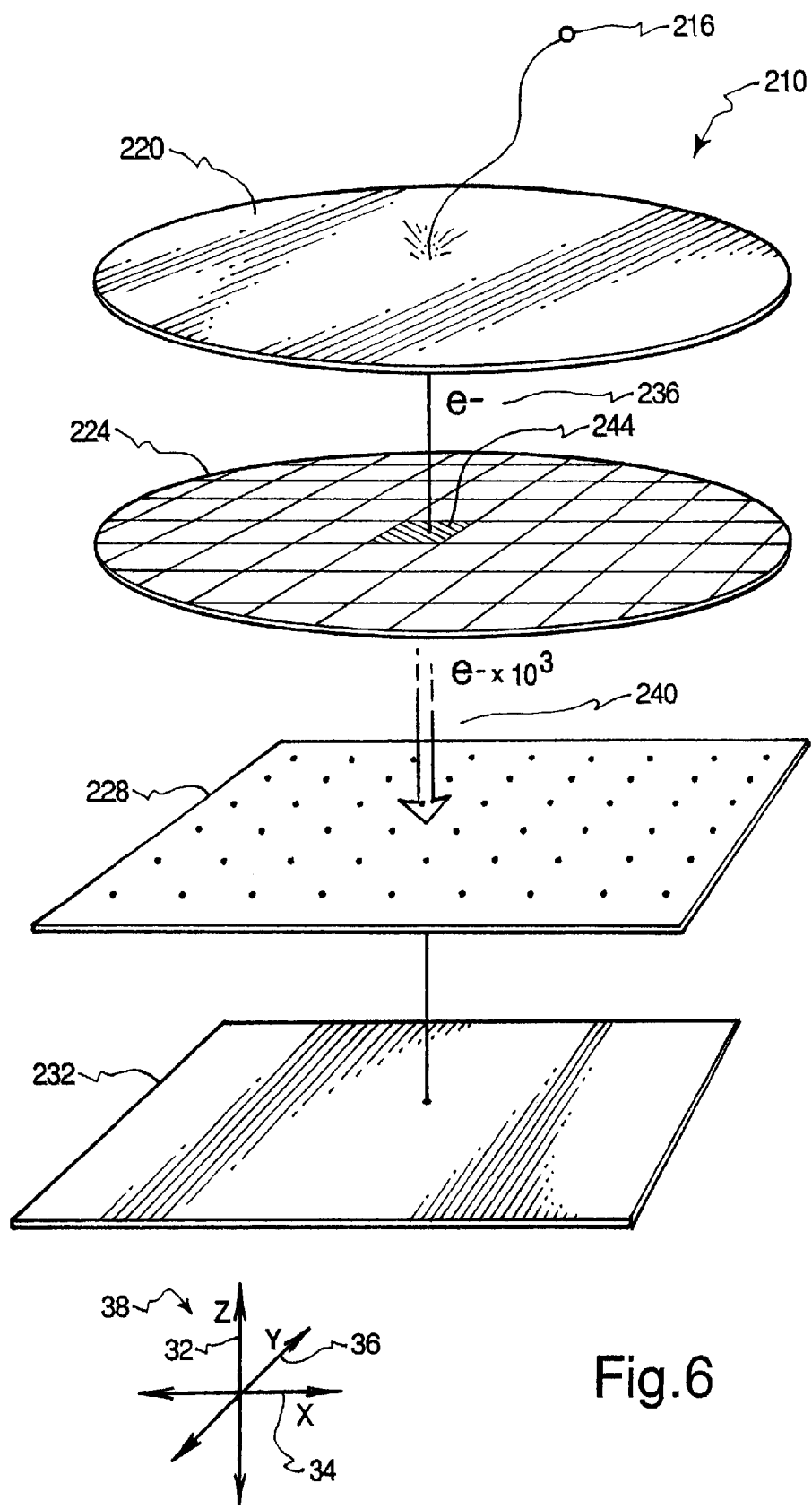
FIG. 6 is perspective view of a photon receiving member.

The resolution of the image may also be increased by the type of photon receiver 116. In the imaging apparatus of FIG. 2, the photon receiver 116 is depicted as receiving a number of individual photons 126, 128, 130 that signal the timing circuits 136 to stop the timing function. In order to receive and measure single photons, the photon receiver 116 may have a number of receiving and amplifying members. FIG. 6 demonstrates a photon receiver 210 configured to receive and measure photons at a single photon level. The photon receiver depicted is comprised of a photocathode 220, a microchannel plate (MCP) 224, an aperture mask 228, and a readout integrated circuit 232.

The photocathode 220 is capable of receiving and measuring individual photons impacting upon the photocathode 220. Each photon 216 received by the photocathode 220 causes the photocathode 220 to emit a photoelectron 236 in place of the photon 216. The emitted photoelectron 236 is ejected from the photocathode 220 in a location that correlates to the arrival position of a photon 216. The photocathode is configured to maintain the outline of a photon image that is reflected off of the target and onto the photocathode 220. Thus, if a rectangular shaped outline of photon is reflected off of the target and onto the photocathode 220, the photocathode 220 will eject a plurality of photoelectron with the same rectangular outline.

Once the photoelectron 236 exits the photocathode 220, the photoelectron 236 is impacted on a MCP 224. The MCP 224 has a geometrically arranged array of passages that are configured to receive a single photoelectron 236. The photoelectron is then converted to an electron by the MCP 224 and amplified to a measurable electron signal 240. A single MCP 224 is capable of amplifying a photoelectron to a measurable signal. However, multiple MCP's 224 can be placed in series to provide further amplification for the photoelectron signal. By converting the photoelectrons 236 to electrons 240 and amplifying the number of electrons 240, a single photon impacting on the photon receiver 210 may be measurably registered. Additionally, the MCP 224 is comprised of a number of individual pixels 244 that maintain the arrival position of the photoelectron 236 on the MCP 224. Thus, the reflected photon outline of the target will be accurately conveyed into the photocathode 220 and out of the MCP 224.

Once the photon 216 is converted into an amplified electron signal 240, the electron signal 240 can be transferred to the associated timing circuit. As illustrated in FIG. 6, the electron signal 240 is transferred through an aperture mask 228 that isolates the individual electron signals 240 from the other electron signals of the other pixels. The electron signal is then sent from the readout integrated circuit 232 to the individual timing circuits. In one embodiment, each of the timing circuits is coupled to a pixel 224, requiring the system to have a similar number of timing circuits and pixels 224.

The photon receiver may also incorporate other devices to convert photons into measurable signals. For example, various photomultiplier tubes or other types of photon-emissive or photo-conductive converter can be employed to convert a photon to an electron signal. Additionally, other devices such as an anode winding and ground plate can be employed to transfer individual electron signals to the timing circuits.

The scope of the present application encompasses any type of photon receiver and timing circuits configured to perform the functions of the elements previously described. For example, the imaging method may be performed by emitting a photon pulse at a target. A voltage for determining a reflection time would begin charging in response the emitted photon pulse. The emitted photons are then reflected off of the target, where the reflected photons are received. The received photons are then converted to photoelectrons and impacted at an arrival position on a geometrically arranged array. The charging of the voltage is stopped to establish a voltage analog that corresponds to the reflection time. The reflection time and the arrival position of the geometrically arranged array are finally analyzed to determine geometric characteristics of the target.

However, other methods of performing the process described above are possible with varying steps. For example, some processes will not measure the reflection time by charging a voltage analog. The reflection time may be measured by any device capable of measuring the time for a photon to impact a target and reflect to a destination. Alternatively, the reflection time may be obtained by a deteriorating signal method. The signal could have a constant deterioration rate that is measurable. When the pulse is emitted, each of the signals would be at the same state. However, because different signals will have different levels of deterioration caused by different reflection times, the deterioration level of the signal can be calibrated to the Z-component of the target. This process may not use photons, but instead other signals or particles to determine the reflections time.

In sum, the present application related to an apparatus and method for providing a three-dimensional image of an object. The object is bombarded by a photon pulse emitted from a photon source. The photons reflect off of the target and are received by a photon receiver. The photon receiver determines an arrival position and reflection time of individual photons reflecting off of the target. The arrival position determines a position on an X-Y plane and the reflection time determines the Z-height of the positions on the X-Y plane. By combining the X, Y, and Z components for multiple photons, a three-dimensional image of an object may be obtained.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. An imaging apparatus, comprising:
   a photon source for emitting a pulse of photons at a target;
   a photon receiver having an array of geometrically arranged pixels, wherein the photon receiver receives photons reflected from the target, wherein the geometrically arranged pixels identify a plurality of photon arrival positions, and wherein the photon receiver is capable of detecting the photon arrival position of a single photon;
   a plurality of timing circuits coupled to the geometrically arranged pixels wherein the timing circuits determine photon reflection times of photons received by the photon receiver, wherein each timing circuit is capable of detecting the reflection time of a single photon; and
   an analyzer for receiving the reflection times and the photon arrival positions, wherein the analyzer determines geometric characteristics of the target by comparing photon arrival times to geometrically arranged photon arrival positions.

2. The imaging apparatus, as recited in claim 1, wherein the photon source includes a laser.

3. The imaging apparatus, as recited in claim 1, wherein the photon receiver includes a photocathode.

4. The imaging apparatus, as recited in claim 1, wherein the photon receiver converts a single photon to a measurable number of electrons.

5. The imaging apparatus, as recited in claim 4, wherein the measurable number of electrons is sufficient provide a responsive signal to the timing circuit.

6. The imaging apparatus, as recited in claim 1, wherein the photon receiver includes a photo-emissive converter.

7. The imaging apparatus, as recited in claim 1, wherein the photon receiver includes a photo-conductive converter.

8. The imaging apparatus, as recited in claim 1, wherein each of the geometrically arranged pixels is coupled to a timing circuit.

9. The imaging apparatus, as recited in claim 1, wherein the timing circuit further includes a sensor configured to detect a photon pulse.

10. The imaging apparatus, as recited in claim 9, wherein the sensor is responsive to radiant energy of a photon.

11. An imaging apparatus comprising:

a photon source for emitting a pulse of photons at a target;

a photon converter for receiving photons reflected from the target, wherein the photons are converted to photoelectrons, and wherein the photon converter generates a photoelectron signal in response to receipt of a single photon;

an array of geometrically arranged pixels for receiving and transferring the photoelectron signal to individual pixel positions, wherein each pixel is capable of detecting the photoelectron signal emitted in response to receipt of a single photon at the photon converter;

a plurality of timing circuits for receiving the photoelectron signal, wherein individual timing circuits are coupled to individual pixels of the array, and wherein the timing circuits begin charging a voltage when the pulse of photons is emitted from the photon source and the timing circuits end charging the voltage when the timing circuit receives the photoelectron signal, wherein the voltage corresponds to a photon reflection time; and an analyzer for receiving the reflection times from multiple timing circuits wherein the value of the reflection times and the geometric arrangement of the pixels associated with the reflection times define geometric characteristics of the target.

12. An imaging method, comprising the steps of:

emitting a pulse of photons at a target;

starting a plurality of timers responsive to the emitted pulse, each timer being coupled to a pixel in a geometrically arranged array of pixels in a photon receiver;

receiving a plurality of photons of the emitted pulse at the photon receiver, wherein the plurality of photons are reflected from the target, wherein each of the plurality of photons generates a photoelectron that is received at one of the pixels to establish a photon arrival position for each received photon, and wherein the photon arrival position of a single photon may be detected;

stopping each timer coupled to a pixel that receives one of the photoelectrons, wherein each stopped timer establishes a reflection time corresponding to one of the received photons; and relating the reflection times and the arrival positions to geometric characteristics of the target.

13. The method, as recited in claim 12, wherein the reflection time corresponds to a duration of time between starting the timer and stopping the timer.

14. The method, as recited in claim 12, wherein the reflection time is established by a voltage analog.

15. The method, as recited in claim 12, wherein the timer is a voltage charging circuit.

16. The method, as recited in claim 12, wherein the timer starts before the photon is emitted.

17. The method, as recited in claim 12, wherein the timer starts after the photon is emitted.

18. An imaging method, comprising the steps of:

emitting a pulse of photons at a target;

charging a plurality of voltage storage devices, wherein the voltage storage devices begin charging when the pulse is emitted at the target, and wherein each voltage storage device is coupled to a pixel in a geometrically arranged array of pixels;

reflecting the pulse off of the target;

receiving a plurality of photons of the reflected pulse;

converting each received photon into a photoelectron;

impinging each photoelectron on one of the pixels of the geometrically arranged array of pixels to establish an arrival position of each received photon;

stopping the charging of each voltage storage device that is coupled to a pixel that received at least one photoelectron to define a voltage analogous to the reflection time of each received photon;

outputting the voltage and the position of each received photon; and analyzing the voltage and the position of each received photon to determine geometric characteristics of the target.

19. The method, as recited in claim 18, wherein the voltage storage device is a capacitor.

20. The method, as recited in claim 18, wherein the photon is converted into a photoelectron by a photocathode.

* * * * *